United States Patent [19]

Rudd et al.

[11] 4,081,648

[45] Mar. 28, 1978

[54] HIGH FREQUENCY IN-LINE, ELECTRICAL WELDING APPARATUS FOR SMALL DIAMETER METAL TUBING

[75] Inventors: Wallace C. Rudd, New Canaan; Humfrey N. Udall, Darien, both of Conn.

[73] Assignee: Thermatool Corporation, Stamford, Conn.

[21] Appl. No.: 765,653

[22] Filed: Feb. 4, 1977

[51] Int. Cl.² .......................................... B23K 31/06
[52] U.S. Cl. ................................... 219/59.1; 219/67
[58] Field of Search .................................. 219/59, 67

[56] References Cited

U.S. PATENT DOCUMENTS

| | | | |
|---|---|---|---|
| 2,857,503 | 10/1958 | Rudd | 219/59 |
| 3,171,942 | 3/1965 | Kohler | 219/59 |
| 3,851,139 | 11/1974 | Rudd | 219/59 X |

*Primary Examiner*—E. A. Goldberg
*Attorney, Agent, or Firm*—Brooks, Haidt, Haffner & Delahunty

[57] ABSTRACT

In-line electrical welding apparatus for welding small diameter, thin-walled, metal tubing as it is advanced longitudinally comprising a high frequency electrical current source, a pair of upstream electrical contacts connected to one terminal of the source and a pair of downstream electrical contacts connected to the other terminal of the source through a proximity conductor which extends in close relation to the edges of the tubing to be heated from the downstream contacts to adjacent the upstream contacts. The contacts are each independently movable toward and away from the tubing along paths parallel to planes parallel to and intersecting the tubing axis and at an acute angle to each other. Guiding means adjacent to the downstream contacts apply welding pressure to the tubing, and further guiding means upstream of the downstream contacts but at least as close to the weld point as the upstream contacts guide the tubing as it is advanced. Both guiding means have surfaces which engage the tubing and which cause the tubing to maintain a non-circular cross-section as it is advanced from the upstream contacts to the weld point.

14 Claims, 12 Drawing Figures

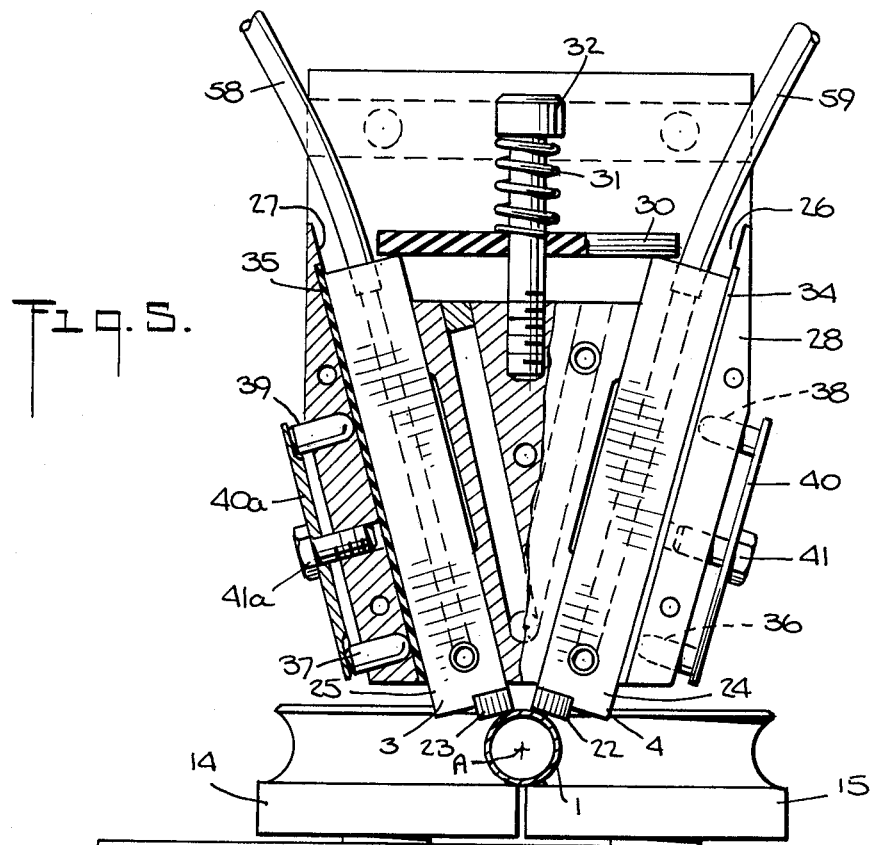
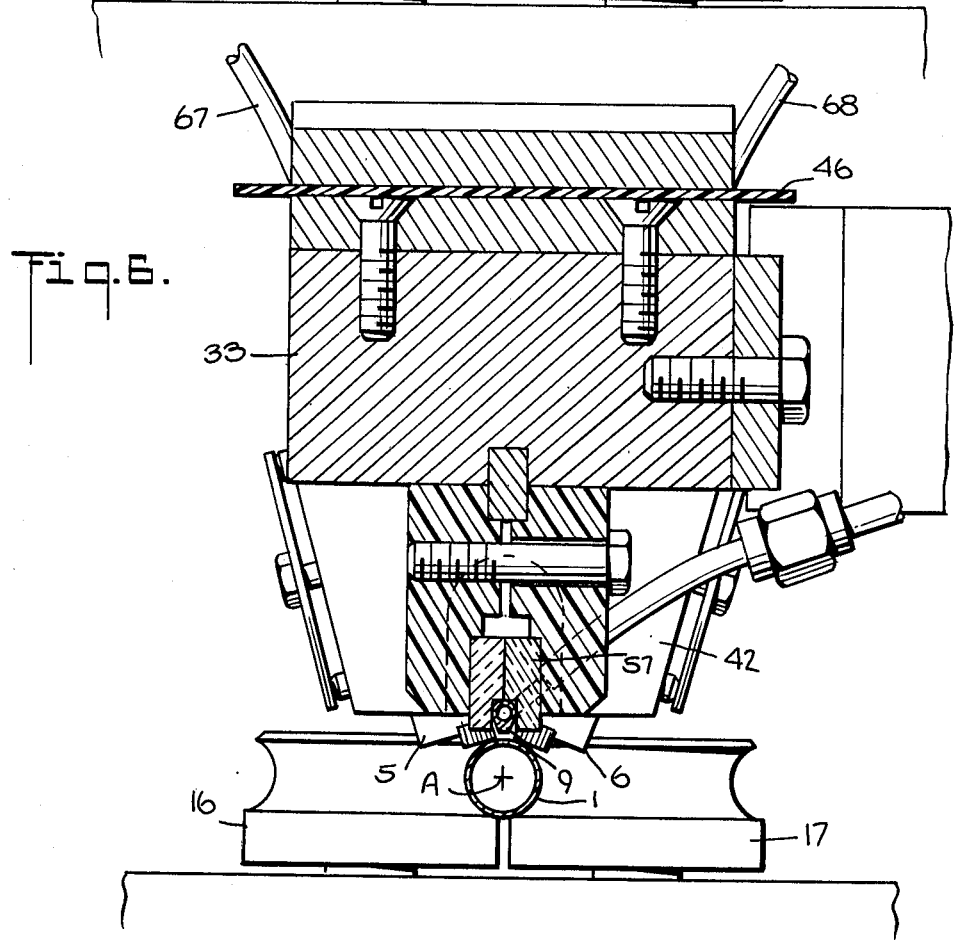

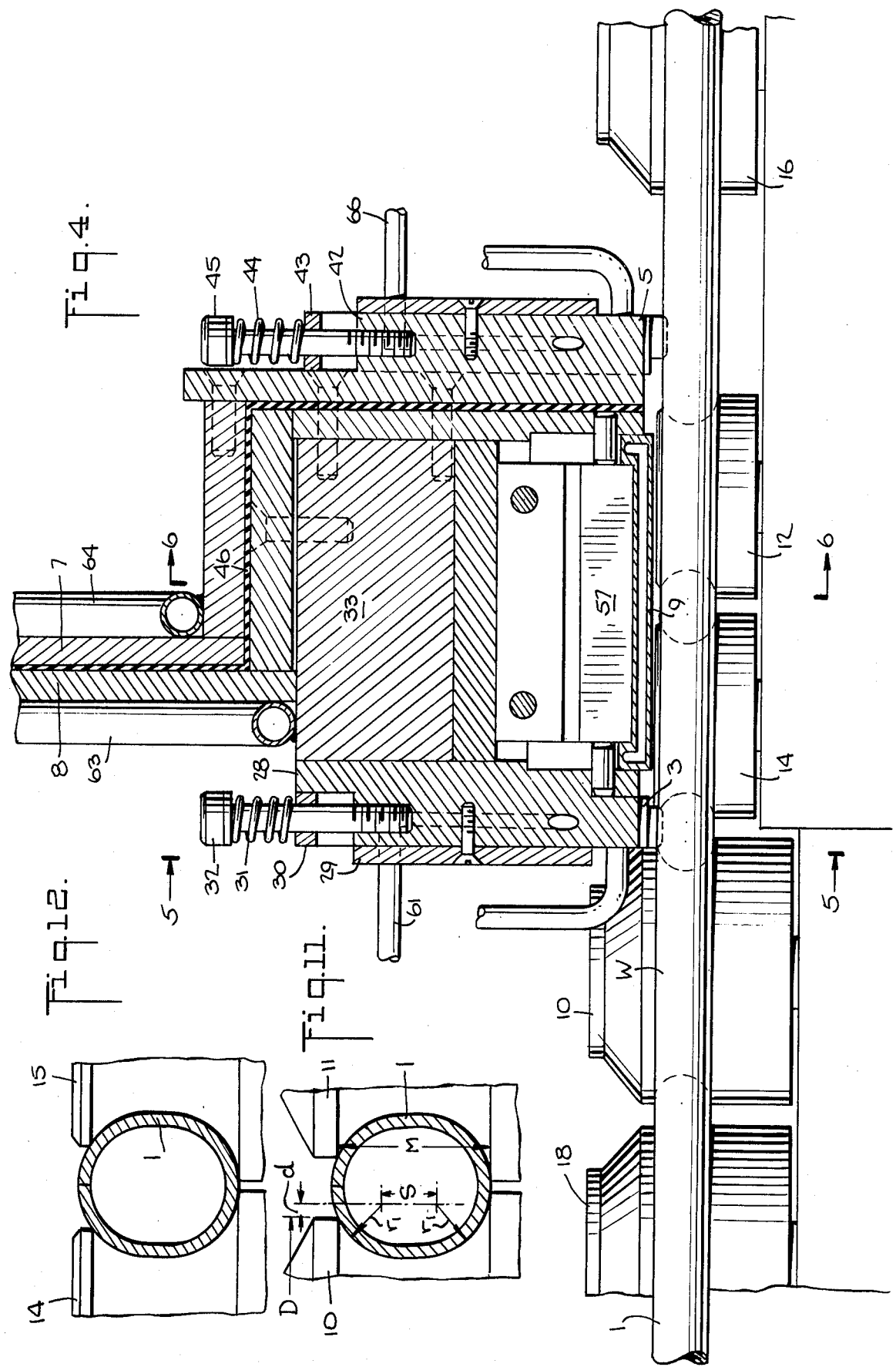

HIGH FREQUENCY IN-LINE, ELECTRICAL WELDING APPARATUS FOR SMALL DIAMETER METAL TUBING

This invention relates to the welding together of the edges of metal strip to form a pipe or tube, in which welding, the strip is formed into an almost completed tube and advanced while the edges of the strip are heated by causing high frequency electrical current to flow along such edges from contacts in advance of the point where the weld is formed to contacts at or near the weld point, such welding being known as "in-line" welding.

So-called "in-line" welding is well-known in the art and is described in U.S. Pat. Nos. 2,857,503 and 2,020,276 and in French Pat. Nos. 862,672 and 1,126,470. In such welding, the metal strip is formed into a tube or pipe as it is advanced in the direction of the tube axis, the edges of the strip being brought into contact at a weld point and being closely spaced or touching in advance of the weld point. When high frequency electrical current is used for heating of the tube edges, one terminal of a high frequency electric power source, e.g., of a frequency of 50 kilohertz or higher, is connected to both edges in advance of the weld point and the other terminal of the source is connected to both edges at or nearer the weld point, whereby the electric current flows along the edges and heats them to welding temperature. Preferably, a portion of the conductor which connects the other terminal to the edges extends along the edges and close thereto from the connection at or near the weld point to the other connection so as to aid in concentrating the current at the edges, such portion being known as a "proximity" conductor. Usually, the terminals of the source are connected to the edges by sliding or rolling contacts.

In-line welding has proven to be satisfactory for many applications. One of its advantages with respect to certain other types of electrical welding is that because of the location of the electrical connections to the strip, almost all the current flows close to the edges and no significant amount of current flows in other parts of the strip where it is wasted. This is of particular advantage when the tube diameter is relatively small, e.g., ⅜ inch or less in outside diameter. However, with in-line welding, as with said other types of welding, it becomes difficult to control the positions of the edges as they are brought toward the weld point and as they are brought together for welding purposes especially when the thickness of the strip or blank (the tube wall thickness) is 0.032 inch or less. The deviation of the edges from the proper positions is even more serious with in-line welding, because even relatively small deviations of the edges from the correct positions in relation to the proximity conductor cause significant changes in the current distribution at, and hence, heating of, the edges which can result in poor or uneven welds.

Another advantage of in-line welding is that because the proximity conductor causes a greater heating at the other surfaces of the edges than at the inner surfaces thereof, the upset internally of the tube may be less, which is of particular value in the manufacture of small diameter cooling tubing and of tubing jackets for electrical heating elements which have a close fit with the elements. On the other hand, close control of the spacing between the proximity conductor and said edges is required in order to obtain this advantage.

With in-line welding using high frequency currents, the pressure of the electrical contacts can be relatively small, which means less marring of the tubing and less deformation of thin metal used to form the tubing. However, problems are encountered with circumferential rolling of the edges with respect to the contacts and with maintaining the contacts in engagement with the edges. Both of these problems affect the heating at the edges and the latter problem can cause arcing or "burn out." The problems are even more severe when the tubing diameter is small, e.g., ⅜ inch or less in outside diameter.

For the reasons set forth hereinbefore, the use of in-line electrical welding for producing small diameter tubing has not been commercially successful prior to the present invention, which eliminates or significantly reduces the problems and which makes in-line welding commercially practical for the welding of small diameter, thin-walled tubing, i.e., having an outside diameter of ⅜ inch or less and a wall thickness of 0.032 inch or less.

One object of the invention is to provide in-line welding apparatus which will properly control the position of the edges of a metal strip being formed into a tube and which will apply heating current to such edges in a manner which will permit uniform welding of small diameter, thin-walled tubing at high speed.

In the preferred embodiment of the invention, a metal strip is advanced longitudinally toward a weld point with its edge surfaces in closely spaced relation or touching at least at a point far enough upstream of the weld to permit the edge surfaces to be heated to the desired temperature by the time that they reach the weld point. At least at a short distance in advance of the weld point the edge surfaces are brought into contact, and at the weld point, the edge surfaces are pressed together with forge welding pressure for forge welding, or are pressed together with lighter pressure for melt welding, but in the latter case they are held together downstream of the weld point until the metal solidifies sufficiently to prevent damage to the weld. At said point upstream of the weld point by a distance sufficient to permit the edge surfaces to be heated to the desired temperature, an upstream pair of independently movable electrical contacts which are movable along paths which are substantially parallel to planes which are at an acute angle to each other and which are parallel to and intersect the axis of the tube being formed engage the strip. Such contacts are electrically connected to the same terminal of a high frequency power source and one engages the strip adjacent one edge thereof and the other engages the strip adjacent the other edge thereof. Shortly in advance of the weld point and, preferably, at some point downstream of the point where the edge surfaces have been brought into contact, a downstream pair of electrical contacts which are independently movable in the same way as the upstream pair of contacts engage the strip adjacent the edges thereof, the downstream pair of contacts being connected to a second terminal of said source through a proximity conductor which extends from the downstream pair of contacts to adjacent the upstream pair of contacts and in close proximity to the strip edges. In advance of, or at, the upstream pair of contacts, a pair of strip guides hold the preformed strip in a shape having a non-circular, e.g., oval, cross-section, and there are guides or rollers at the weld point which maintain non-circular the cross-sectional shape of the strip so that the strip is non-circular from the upstream pair of contacts to the weld point. There should be at least one pair of such guides at least as close to the weld point as said upstream pair of contacts. In melt welding, at least one pair of guides which will maintain the non-circular cross-section which the strip has at the weld point are disposed downstream of the weld point a distance sufficient to make certain that the weld is not significantly distorted prior to the time that the weld metal sets or solidifies sufficiently to maintain a desired weld seam.

Other objects and advantages of the invention will be apparent to those skilled in the art from the following description of the presently preferred embodiments thereof, which description should be considered in conjunction with the accompanying drawings in which:

FIG. 4 is a side elevation view, partly in cross-section, of the embodiment of the invention shown in FIGS. 2 and 3 and is taken along the line 4—4 indicated in FIG. 3;

Figure 1:
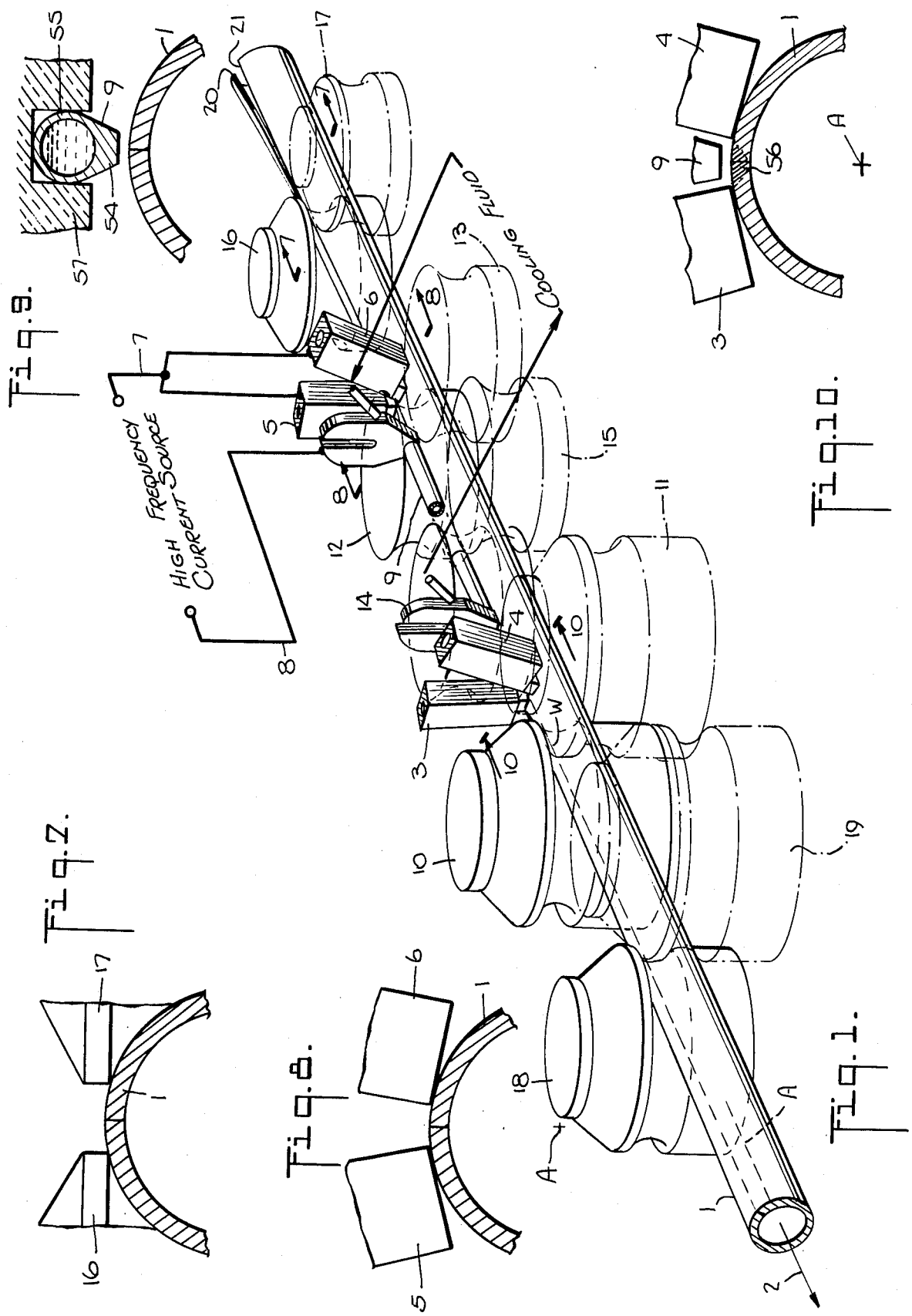
FIG. 1 is a diagrammatic perspective view of the preferred embodiment of the invention.

FIGS. 5 and 6 are end elevation views, partly in cross-section, and are taken respectively along the lines 5—5 and 6—6 shown in FIG. 4;

FIGS. 7, 8 and 10 are enlarged, fragmentary, end views, partly in cross-section, of portions of the apparatus shown in FIGS. 1-6 and are taken respectively along the lines 7—7, 8—8 and 10—10 shown in FIG. 1;

FIG. 9 is an enlarged, cross-sectional, end view of the proximity conductor portion of the embodiment illustrated in FIG. 6;

FIG. 11 is a fragmentary, end view illustrating a pair of guide rollers in contact with the tub to be welded; and FIG. 12 is a fragmentary, end view illustrating the downstream guide rollers which are intermediate the upstream and downstream electrical contacts and which are in contact with the tube to be welded.

As mentioned hereinbefore, in-line electrical welding has been successfully employed and has certain advantages in certain types of welding but has not heretofore been commercially successful for the welding of small diameter, thin-walled tubing, i.e., having an outside diameter of ⅜ inch or less and a wall thickness of 0.032 inch or less. Certain of the features of the in-line welding apparatus of the invention have been known per se in various types of welding but have not been employed in combination for in-line welding apparatus. We have discovered that by combining such features and other features in a particular manner, commercially satisfactory, small diameter, thin-walled tubing can be welded by the apparatus of the invention at relatively high, commercially desirable speeds. Of course, the apparatus of the invention is not limited to use for the welding of small diameter, thin-walled tubing and may be used for welding larger diameter, thicker walled tubing.

Briefly stated, the features which we have found to be necessary, in addition to the conventional tube forming and advancing means, the proximity conductor and a high frequency current source, are:

(1) Independently movable electrical contacts in each pair of upstream and downstream contacts which are movable along paths directed parallel to planes parallel to and intersecting the axis of the tube, the planes being at an acute angle to each other, preferably, at an angle from 20° to 60°, so that sidewise forces tending to cause the contacts to bind in their guides are minimized. Preferably, an extension of a contact parallel to its path of movement intersects the axis of the tube but space, heat and welding spatter and spume conditions may not always permit the preferred disposition of the contacts.

(2) Close control of the position of the tube edges as they pass from the upstream contacts to the weld point, both in relation to each other and in relation to the proximity conductor, by means of guiding means having tube engaging surfaces which cause the tube to be non-circular in cross-section, e.g., oval, and located both at the weld point and at least as close to the weld point as the upstream contacts. In the case of melt welding, as distinguished from forge welding, further guiding means are located downstream of the guiding means at the weld point to maintain the edges of the tube in fixed relative positions until the molten metal has set sufficiently to prevent damage to the weld. Preferably, also, there is similar guiding means disposed intermediate the guiding means at the weld point and the guiding means at the upstream contacts.

The preferred embodiment of the apparatus of the invention which is illustrated in the drawings includes said features, and FIG. 1 is a schematic, perspective view of the preferred embodiment of the invention.

In FIG. 1, a small diameter, thin-walled, metal tube 1 is advanced in the direction of the arrow 2 by advancing means well-known in the art, and a portion of the advancing means may be one or more of the rollers hereinafter described, which rollers would be power driven.

The apparatus of the invention comprises a pair of independently movable, downstream, electrical contacts 3 and 4 and a pair of independently movable, upstream, electrical contacts 5 and 6. As indicated in FIG. 1, the contacts 3-6 are disposed at an angle to a vertical plane which is parallel to and intersects the axis A of the tube 1.

The contacts 5 and 6 are connected by a lead 7 to one terminal of a high frequency electrical power source, such as an electrical source providing currents having a frequency of the order of 50 kHz or higher. The other terminal of the high frequency source is connected by a lead 8 to the contacts 3 and 4 by way of a proximity conductor 9 which is connected at its downstream end to the contacts 3 and 4.

Because the tube 1 has a relatively thin wall and in order to avoid marring and deflection of the wall, the pressure of the contacts 3-6 should be kept relatively low as compared to contact pressures required with low frequency electrical welding. It is known in the art that by using high frequency heating current relatively high currents may be delivered to metal being heated by relatively small contacts without pressing them agaist the metal with the forces required when low frequency currents are used, and this is one reason, namely, to prevent significant deflection and marring of the thin wall of the tube, that high frequency currents are employed. Deflection of the edges of the tube 1 not only causes an uneven weld, but also changes the current distribution in the edge portions which is undesirable.

The apparatus of the invention comprises a plurality of tube edge control means which may be a plurality of guiding means in the form of suitably shaped, stationary plates or blocks, but which, preferably, are a plurality of pairs of grooved rollers. Thus, the guiding means in the preferred embodiment illustrated comprises a pair of downstream, grooved rollers 10 and 11 adjacent the downstream contacts 3 and 4 and adjacent the weld point W. The guiding means in the preferred embodiment also includes a pair of upstream, grooved rollers 12 and 13 adjacent to the upstream contacts 5 and 6, a pair of intermediate, grooved rollers 14 and 15, a pair of grooved guiding rollers 16 and 17 and a pair of grooved exit rollers 18 and 19.

The tube 1 is formed from a relatively long and narrow strip having a pair of edges 20 and 21, which, in advance of the guiding rollers 16 and 17, may be slightly spaced apart. The edges 20 and 21 may be maintained in spaced apart relation until they are substantially at the weld point W, but, preferably, the faces thereof, i.e., the radially extending faces at the edges 20 and 21, are brought into abutting relation by the time that they reach the contacts 5 and 6, the edge faces being maintained in abutting relation from the contacts 5 and 6 to the weld point W. If the edges 20 and 21 are to be forge welded together, they are brought up to forge welding temperature by reason of the current flowing therein from the contacts 3 and 4 to the contacts 5 and 6, and vice versa, by the time that they reach the weld point W, at which point the edge faces are pressed together with forge welding pressure by the rollers 10 and 11 to produce a forge weld between the edges 20 and 21. If, however, the edges 20 and 21 are to be welded together by means of a melt weld, the temperature thereof is brought up to the melting temperature thereof by the time that they reach the weld point W, at which point they are pressed together by the rollers 10 and 11 by an amount adequate to produce the desired weld, and they are maintained in substantially fixed relation from the rollers 10 and 11 until they pass between the rollers 18 and 19. The rollers 18 and 19 are so disposed with respect to the weld point W that in melt welding the molten metal is cooled sufficiently to prevent deformation of the weld after the tube 1 leaves the rollers 18 and 19. Whether the edges 20 and 21 are merely brought up to forge welding temperature or a higher melting temperature depends on many factors known to those skilled in the art, such as speed of tube advance, welding current magnitude, spacing between the contacts 5 and 6 and the contacts 3 and 4, etc.

The tube 1, in a commercial installation, may be advanced at 150 feet per minute or higher. The spacing between the contacts 3 and 4 and the contacts 5 and 6 usually is of the order of 5 to 6 inches. Accordingly, as will be apparent to those skilled in the art, there is a significant mechanical problem in keeping the edge faces, which have a radial dimension of 0.032 inches or less, in opposed or abutting relation during the time that the heating current flows therein and up to the weld point.

Also, as is known in the art, the proximity conductor 9 is employed to concentrate the heating current at the edges 20 and 21, current flow elsewhere being undesirable and inefficient. The current distribution and concentration at the edges 20 and 21, and hence, the heating at the edges 20 and 21, is affected by both the spacing of the edges 20 and 21 with respect to the proximity conductor 9 and their positions relative thereto. Thus, an increase in such spacing reduces the concentration and vice versa. Also, if one edge 20 or 21 is nearer the proximity conductor 9 than the other, such one edge will have greater current flow therein. It is, of course, desirable to have uniform current flow at the edges 20 and 21 as they advance from the contacts 5 and 6 to the contacts 3 and 4 and to have substantially equal current flows at the edges 20 and 21 during such advance in order to obtain uniform welding without weak or imperfect areas along the seam, particularly when the tubing is to be used to convey fluids.

Accordingly, close control of the positions of the edges 20 and 21 during their advance from the contacts 5 and 6 to the weld point W is most important for several reasons, and such control becomes more difficult as the diameter and wall thickness of the tube 1 decrease.

In the apparatus of the invention, the desired relative positions of the edges 20 and 21 during the advance thereof from the contacts 5 and 6 to the weld point W are closely maintained by employing upstream guiding means 12 and 13 adjacent to the contacts 5 and 6, or at least as close to the weld point W as the contacts 5 and 6 but spaced upstream of the downstream guiding means 10 and 11, and downstream guiding means 10 and 11 adjacent the weld point W which guiding means 12 and 13 and 10 and 11 maintain a non-circular, cross-sectional shape for the tube 1 as it advances toward the weld point W. Various non-circular, cross-sectional shapes may be employed and apparatus for producing such shapes are well-known in the art. However, in the preferred form of the invention, the shape is an oval, either an ellipse, an ellipsoid or a modified form thereof, which provides the necessary control without causing the cross-sectional shape of the tubing as it leaves the rollers 18 and 19 to be substantially different from a circle which usually is the preferred cross-sectional shape. If the cross-sectional shape of the tube after it leaves the rollers 18 and 19 is not the desired shape, it may be modified by subsequent working in a known manner.

Although the tubing engaging surfaces of the rollers 10–15 may, with certain non-circular configurations of the tube 1, be circular in cross-section and maintain the tube 1 in its non-circular configuration, e.g., the portions of the tube 1 which are engaged by the rollers are circular in cross-section, in the preferred embodiment of the invention, the surfaces of the rollers 10–15 which define the grooves therein extending around the axes of rotation thereof conform, in cross-section, to a portion of an oval, so that the cross-sectional shape of the tube 1 is oval from the time that it is at the rollers 12 and 13 until it passes between the rollers 10 and 11. Preferably, the tube engaging surfaces of the rollers 10–15 almost completely surround and engage substantially all of the peripheral surface of the tube 1, as shown in FIGS. 11 and 12. Preferably, the surfaces of all the rollers 10–15 have the same cross-sectional shape, and if desired, but not necessarily, the surfaces of the rollers 16 and 17 which define the grooves therein may have the same cross-sectional shape as the surfaces of the rollers 10–15. Similarly, the surfaces of the rollers 18 and 19 which define the grooves therein may have the same cross-sectional shape as the surfaces of the rollers 10 and 11 but may be modified to take into account the change in the cross-sectional shape of the tube 1 caused by the rollers 10 and 11 when it applies welding pressure to the edges 20 and 21, particularly bearing in mind that in melt welding, the tube shape would not be significantly changed until after the molten metal has set sufficiently to avoid undesirable disturbance of the weld metal.

As an example of a surface shape satisfactory for welding a tube 1 having a nominal outside diameter of ½ inch, reference is made to FIG. 11, wherein the dimensions may be:
D = 2.25 in.
d = 0/015 in.
M = 0.556 in.
$r_1$ = 0.235 in.
S = 0.086 in.

In FIG. 11, the major axis of the oval is vertical, but if desired, the major axis may be horizontal by changing the shape of the surfaces of the rollers.

In addition to imparting a non-circular, cross-sectional shape to the tube 1, high frequency current, i.e., a current having a frequency of 50,000 hertz or higher, is used for the heating current to thereby keep the necessary contact pressure low, and hence, to keep deflection or distortion of the tube edges 20 and 21 substantially negligible, and the contacts 3–6 are mounted as described hereinbefore and hereinafter, to prevent binding of the contacts 3–6 in their guides and thereby minimize both undesired deflection of the tube edges 20 and 21 and delay in following of the tube 1 surfaces by the low-inertia contacts 3–6 even though the spring pressure applied to the contacts 3–6 for urging them against the tube 1 is relatively small.

FIGS. 2–6 illustrate a mechanical embodiment of the apparatus of the invention which has been successfully used to weld thin-walled, steel tubing having an outside diameter of ½ inch at speeds of advance of up to 150 feet per minute. The heating current had a frequency of about 400 kHz.

With reference to FIGS. 2–6, downstream contacts 3 and 4 comprise tips 22 and 23 of a good conductivity, wear resistant metal secured to copper supports 24 and 25 by brazing. The supports 24 and 25 are slidably mounted in grooves 26 and 27 in a copper contact guide 28 having a cover 29 of electrical insulating material. The contacts 3 and 4 are urged toward the tube 1 by a bar 30 of insulating material, and a spring 31 engaging the bar 30 and the head of an adjustable bolt 32 threaded into the guide 28. The guide 28 is secured by screws to a supporting block 33 of insulating material which is secured by screws to the lead 8 made of copper bar stock.

With high frequency electrical currents, as distinguished from low frequency and direct currents, varying the length of the conductive path for the currents makes a significant difference in the current flow due to the fact that the path impedance is not merely resistive. Accordingly, since current flows to the contacts 3 and 4 by way of contact with the guide 28, it is desirable to make the current paths to the contacts 3 and 4 as short as possible and substantially the same length in order to avoid power loss and uneven distribution of the current to the contacts 3 and 4, and hence, to the edges 20 and 21. The current is fed to the guide 28 centrally thereof, and it will be noted that in the embodiment shown, the current can flow from the guide 28 to the upstream sides, to the facing sides and, in the event of omission of strips 34 and 35 of insulation, to the oppositely facing sides of the contacts 3 and 4, the last paths being the longest. Strips 34 and 35 are provided to eliminate said last paths.

The strips 34 and 35 are received in recess in the facing or outer walls of the grooves 26 and 27 and are pressed, respectively, against the contacts 4 and 3 by pins 36, 37, 38 and 39 slidable in holes in the guide 28 and in engagement with the strips 34 and 35. The pins 36 and 38 are pressed by a flexible, resilient strip 40, preferably of insulation, urged toward the contact 4 by an adjustable bolt 41 threaded into the guide 28. The pins 37 and 39 are similarly pressed by a flexible, resilient strip 40a urged toward the contact 3 by an adjustable bolt 41a threaded into the guide 28.

It will also be observed from the drawings that the tips 22 and 23 which engage the tube 1 are spaced apart in a direction transverse to the direction of advance of the tube 1. The purpose of such spacing is to keep the tips away from the hottest part of the metal of the tube 1, i.e., at the edges 20 and 21, and to permit welding particles to pass between the tips 22 and 23. However, it will also be noted that if the contacts 3 and 4 were mounted for movement along parallel vertical paths, as viewed in FIGS. 2–6, the diameter of a small diameter tube 1 is such that there are significant forces exerted on the contacts 3 and 4 urging them away from each other. Accordingly, if the grooves 26 and 27 in the guide 28 were parallel, causing the paths of movement of the contacts 3 and 4 to be parallel, the contacts 3 and 4 would tend to bind in the grooves 26 and 27 or at least the friction between the contacts 3 and 4 and the walls of the grooves would be increased. Such binding or friction would decrease the ability of the contacts 3 and 4 to follow the surface of the tube 1 and thereby cause non-uniform current flow at the edges 20 and 21 and, in some cases, arcing between one or both of the contacts 3 and 4 and the tube 1, which can damage the tube 1.

For these reasons, the contacts 3 and 4 are mounted for movement toward and away from the tube 1 along paths which are substantially parallel to planes at an acute angle to each other and parallel to and intersecting the axis A of the tube 1. Preferably, said paths should be in such planes, but because of the spacing required between the contacts 3 and 4, this is not always possible. However, by so arranging said paths, binding of the contacts 3 and 4 in their respective grooves 27 and 26 and friction between the contacts 3 and 4 and such grooves, is minimized. The angle between said planes, and hence said paths, should be between 20° and 60°, the angle increasing with a decrease in the diameter of the tube 1.

The contacts 5 and 6 are mounted similarly to the contacts 3 and 4, and are slidably mounted in a guide 42 with their paths of movement toward and away from the tube 1 parallel to planes at an acute angle to each other, i.e., 20° to 60°, and parallel to and intersecting the axis A of the tube 1. The contacts 5 and 6 are urged toward the tube 1 by a bar 43, a spring 44 and an adjustable bolt 45 threaded into the guide 42. Preferably, each of said last-mentioned planes is co-extensive with the corresponding planes for the contacts 3 and 4 but, in some cases, the angle between the planes to which the paths of the contacts 5 and 6 are related may be different from the angle between the planes to which the paths of the contacts 3 and 4 are related.

The contact guide 42 is secured by screws to the lead 7 made of copper bar stock and the leads 7 and 8 are separated by a sheet of insulation 46. The leads 7 and 8 are electrically and mechanically connected to the output transformer 47 of the high frequency source by means of copper tabs 48 and 49 secured to the leads 8 and 7 by brazing and by means of bolts 50 and 51.

The transformer 47 is mounted on an adjustable, supporting shelf 52 (FIG. 3) and the transformer 47, as well as the leads 7 and 8, mechanically and electrically connected thereto, act as supports for the contact assembly. The contact asembly is further supported by a bracket 53 secured to the shelf 52 at one end and secured, at its opposite end, to the block 33.

As shown in FIG. 4, the proximity conductor 9 is connected electrically and mechanically at one end to the lead 8 and is mechanically and electrically connected at its opposite end to the guide 28. Thus, the path of the current flow from the high frequency source, in one direction, is by way of the lead 7, the guide 42, the contacts 5 and 6, the tube 1, the contacts 3 and 4, the guide 28, the proximity conductor 9 and the lead 8.

Although the proximity conductor may be a copper tube circular in cross-section, the currents involved in the welding are relatively large and, therefore, in order to carry the current, the proximity conductor 9 must have a size greater than the desired width of the heating pattern at the edges 20 and 21. For this reason, as well as for the purpose of protecting the tubing, which carries cooling water, against burnout in the event that the proximity conductor 9 touches the tube 1, the proximity conductor 9 is provided with a trapezoidal portion 54 (FIG. 9) having its shortest side adjacent to the tube 1. The trapezoidal portion 54 may be a copper strip of the desired shape, brazed to a copper tube 55. The heat pattern produced in the tube 1 by the apparatus of the invention is indicated by the shading 56 shown in FIG. 10.

It is known in the art that the heating pattern 56 can be narrowed and the amount of current in areas of the tube 1, other than at the edges 20 and 21, can be reduced by using magnetic material on opposite sides of the portion of the metal of the tube 1 where it is desired to have the current flow. In the preferred embodiment of the invention, the proximity conductor 9 is surrounded, except at the side thereof nearest the tube 1, by a plurality of plates 57 (FIGS. 4, 6 and 9) of low-loss, magnetic material suitable for use at high frequencies.

Figure 2:
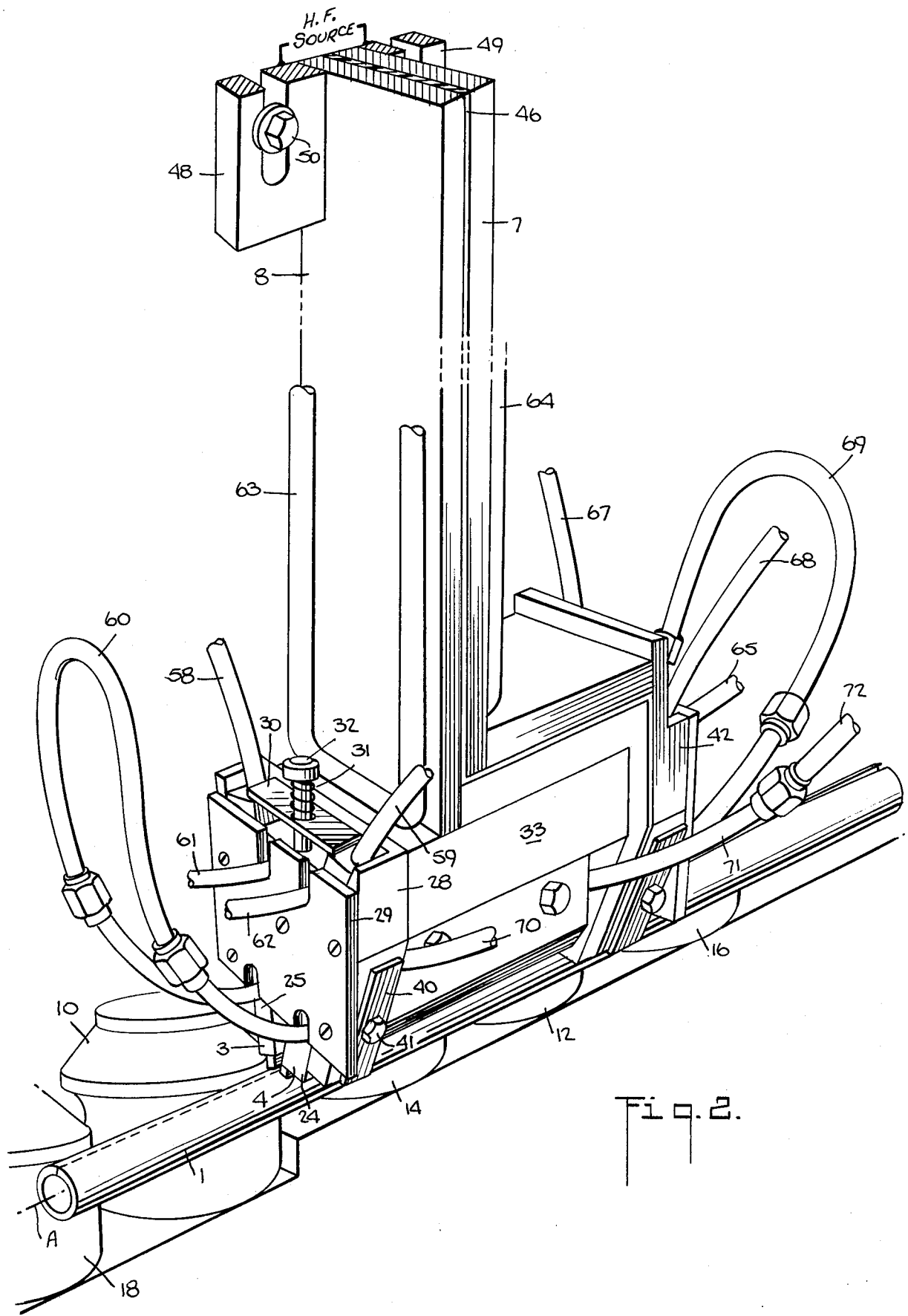
FIG. 2 is a partly diagrammatic perspective view of a preferred mechanical embodiment of a portion of the apparatus shown in FIG. 1.
Figure 3:
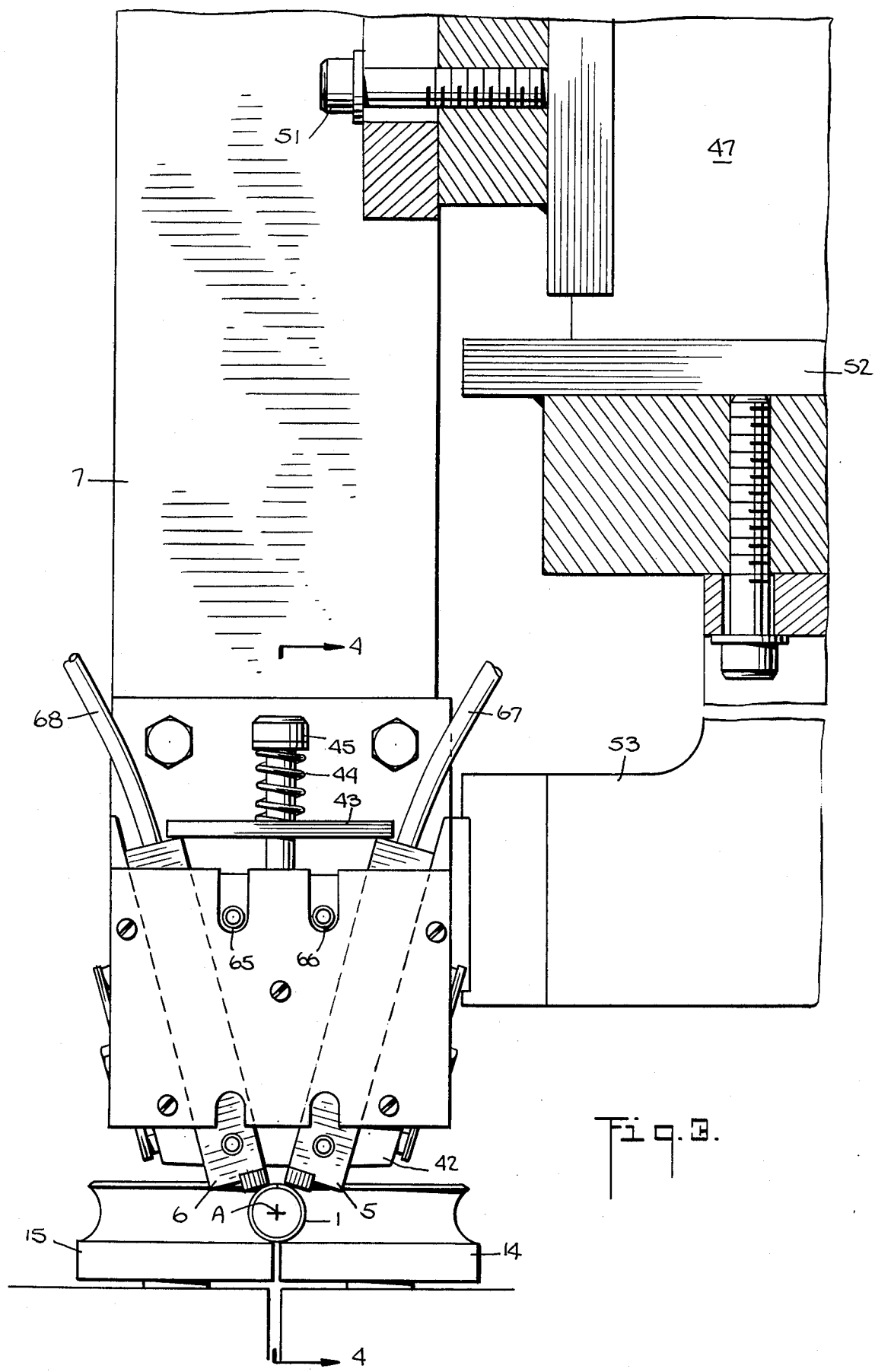
FIG. 3 is an end view of the apparatus shown in FIG. 2.

Because of the relatively high currents normally employed in welding of the type to which the invention relates, e.g., of the order of 1,000 amperes or more, and because of the heat produced in the tubing by the flow of such currents, it usually is necessary to cool the leads 7 and 8, the contacts 3–6, the proximity conductor 9 and the guides 28 and 42. With reference to FIG. 2, cooling water is supplied to passageways in the supports 24 and 25 of the contacts 3 and 4 by way of tubes 58 and 59 connected to the water supply by flexible tubes of insulating material, and the cooling water is transferred from one support to the other, e.g., from 25 to 24, by way of flexible tube 60 of insulating material. The guide 28 is cooled by supplying cooling water to passageways therein by way of tubes 61 and 62 connected to the water supply by flexible tubes of insulating material. The lead 8 is cooled by causing cooling water to flow through a copper tube 63 secured to the lead 8 by brazing.

Similarly, the lead 7 is cooled by supplying cooling water through a copper tube 64, the guide 42 is cooled by cooling water supplied through tubes 65 and 66 (FIGS. 2 and 3) and the contacts 5 and 6 are cooled by supplying cooling water through tubes 67, 68 and 69. The proximity conductor 9 is cooled by supplying cooling water through copper tubes 70 and 71, the tubes 70 and 71 being connected to the source of cooling water through flexible tubes of insulating material, such as the tube 72.

In the operation of the apparatus of the invention, the tube 1 in almost completed form is inserted between the rollers 16 and 17 and advanced until it reaches the rollers 10 and 11. At this time, the contacts 3–6 are engaged with the tube 1 at opposite sides of the abutting edge faces and while the tube is advanced by advancing apparatus of a conventional type, the high frequency source is energized causing current to flow from the contacts 3 and 4 to the contacts 5 and 6, and vice versa, and causing the edges 20 and 21 to heat up to the temperature desired for the type of welding employed, e.g., forge welding or melt welding, and as the heated edges 20 and 21 reach the rollers 10 and 11, the edges 20 and 21 are pressed together to form the desired weld. Thus, a continuous, longitudinal seam weld is produced.

As explained hereinbefore, if the edges 20 and 21 have been heated to their melting temperature by the time that they reach the rollers 10 and 11, the rollers 18 and 19 maintain the edges 20 and 21 in substantially fixed relation until after they pass between the rollers 18 and 19, the position of the rollers 18 and 19 with respect to the rollers 10 and 11 being such that during the time that the edges advance from the rollers 10 and 11 to the rollers 18 and 19, the molten metal cools sufficiently to prevent significant modification of the weld after it leaves the rollers 18 and 19.

Although preferred embodiments of the present invention have been illustrated and described, it will be apparent to those skilled in the art that various modifications may be made without departing from the principles of the invention.

What is claimed is:

1. Apparatus for welding together at a weld point the edges of a thin metal strip formed substantially into a small diameter tube with said edges extending longitudinally of the tube, said apparatus comprising means for longitudinally advancing said tube toward said weld point, a pair of downstream electrical contacts engageable with said tube and disposed adjacent said weld point, one of said pair of contacts being engageable with said tube at one of said edges thereof and the other of said pair of contacts being engageable with said tube at the other of said edges thereof, a pair of upstream electrical contacts engageable with said tube and spaced from said downstream pair of contacts by a distance sufficient to permit said edges to reach welding temperature as they reach said weld point, one of said upstream pair of contacts being engageable with said tube at one of said edges thereof and the other of said second pair of contacts being engageable with said tube at the other of said edges thereof, a source of electrical current of a frequency of at least 50 kilohertz, means connecting one terminal of said source to both of said upstream contacts, means connecting the other terminal of said source to both of said downstream contacts, said last-mentioned means including a proximity conductor extending from adjacent said upstream contacts to said downstream contacts in closely spaced relation to the path of both said edges as they are advanced from said upstream contacts to said downstream contacts, each contact of said upstream and said downstream contacts being independently movable toward and away from, and being urged toward, said tube, one contact of said pair of downstream contacts being movable along a path which extends substantially parallel to a first plane parallel to and intersecting the longitudinal axis of said tube and the other contact of said pair of downstream contacts being movable along a path which extends substantially parallel to a second plane parallel to and intersecting the longitudinal axis of said tube but which extends at an acute angle to said first plane and one contact of said pair of upstream contacts being movable along a path which extends substantially parallel to a third plane parallel to and intersecting the longitudinal axis of said tube and the other contact of said pair of upstream contacts being movable along a path which extends substantially parallel to a fourth plane parallel to and intersecting the longitudinal axis of said tube but which extends at an acute angle to said third plane, and means for controlling the positions of said edges relative to each other and to said proximity conductor comprising downstream guiding means adjacent said downstream contacts and at said weld point and upstream guiding means spaced from said downstream guiding means in the direction opposite to the direction of advance of said tube by a distance no greater than the distance between said upstream contacts and said weld point, each of said guiding means having a surface engageable with said tube for maintaining said edges in opposed relation and both said surface of said upstream guiding means and said surface of said downstream guiding means being shaped, in cross-section, to maintain said tube with a non-circular cross-section as it is advanced from said upstream guiding means to said downstream guiding means.

2. Apparatus as set forth in claim 1, wherein said surface of said upstream guiding means and said surface of said downstream guiding means are non-circular in cross-section.

3. Apparatus as set forth in claim 2, wherein each said acute angle is from 20° to 60°.

4. Apparatus as set forth in claim 3, wherein said first plane and said third plane are co-extensive and said second plane and said fourth plane are co-extensive.

5. Apparatus as set forth in claim 3, wherein the contacts of said upstream contacts are spaced from each other in a direction transverse to the direction of advance of said tube to permit said edges to pass therebetween and the contacts of said downstream contacts are spaced from each other in a direction transverse to the direction of advance of said tube to permit said edges to pass therebetween.

6. Apparatus as set forth in claim 5, further comprising further guiding means disposed intermediate said upstream guiding means and said downstream contacts, said further guiding means having a surface engageable with said tube for maintaining said edges in opposed relation which is non-circular in cross-section.

7. Apparatus as set forth in claim 5, wherein each said guiding means is a pair of grooved rollers, one rotatably mounted at one side of said tube and the other rotatably mounted at the other side of said tube, each roller having a groove extending around the axis of rotation thereof and defined by a surface of the roller, said last-mentioned surface being the non-circular surface of the guiding means.

8. Apparatus as set forth in claim 7, wherein said surface defining said groove has, in cross-section, the shape of a portion of an oval.

9. Apparatus as set forth in claim 1, wherein each of said pair of upstream contacts is slidably mounted on a first contact guide and each of said pair of downstream contacts is slidably mounted on a second contact guide, each said guide being made of electrically conductive metal and having a pair of side-by-side grooves spaced from each other in a direction transversely of the direction of advance of said tube and extending toward the axis of said tube, one contact being slidably mounted in one of said pair of grooves and the other contact being slidably mounted in the other of said pair of grooves, and further comprising electrical insulation between the sidewalls of said grooves most remote from each other, whereby the contacts in said grooves are electrically insulated from said sidewalls, spring means on each said guide engaging said insulation and urging said insulation and said last-mentioned contacts toward each other and further spring means on each said guide engaging said last-mentioned contacts and urging said last-mentioned contacts toward the axis of said tube.

10. Apparatus as set forth in claim 9, wherein said proximity conductor is electrically connected to said second guide.

11. Apparatus as set forth in claim 1, wherein said proximity conductor comprises a hollow conductor having a side thereof nearer said edges than the remainder thereof, said hollow conductor, in cross-section, increasing in width in a direction away from said side and having a bore which is spaced from said side by a distance which is greater than the spacing of said bore from the side of said hollow conductor opposite from said first-mentioned side thereof.

12. Apparatus as set forth in claim 11, wherein said hollow conductor comprises a tube which is circular in cross-section mechanically and electrically secured to an electrically conductive metal strip which is trapezoidal in cross-section, the narrowest side of said strip forming said first-mentioned side of said hollow conductor.

13. Apparatus as set forth in claim 1, further comprising magnetic means at the sides of said proximity conductor other than the side thereof nearest said edges.

14. Apparatus as set forth in claim 1, further comprising further guiding means downstream of said downstream guiding means for maintaining said edges in substantially fixed relation downstream of said downstream guiding means, said further guiding means having a surface engageable with said tube which has a shape, in cross-section, corresponding to the shape of said surface of said downstream guiding means.

* * * * *